United States Patent [19]

Kistner

[11] Patent Number: 4,880,680
[45] Date of Patent: Nov. 14, 1989

[54] ARTICLE OF MANUFACTURE AND METHOD FOR ENCASING SAME

[75] Inventor: David R. Kistner, Troy, Mich.

[73] Assignee: Sota Technology, Inc., Troy, Mich.

[21] Appl. No.: 197,595

[22] Filed: May 23, 1988

[51] Int. Cl.$^4$ ................................................ B32B 1/06
[52] U.S. Cl. .......................................... 428/74; 428/76
[58] Field of Search ............................... 428/74, 71, 76

[56] References Cited

U.S. PATENT DOCUMENTS

| | | | |
|---|---|---|---|
| 3,589,967 | 6/1971 | Shirakawa | 156/287 |
| 3,863,758 | 2/1975 | Connelly | 428/74 X |
| 4,104,430 | 8/1978 | Fenton . | |
| 4,485,590 | 12/1984 | Legg et al. | 428/76 |
| 4,664,738 | 5/1987 | Tadros . | |
| 4,671,979 | 6/1987 | Adiletta | 428/74 |
| 4,675,225 | 6/1987 | Cutler | 428/74 |
| 4,692,199 | 9/1987 | Kozlowski et al. . | |
| 4,737,226 | 4/1988 | Inoue . | |
| 4,740,417 | 4/1988 | Tornero | 428/316.6 |

Primary Examiner—Alexander S. Thomas
Attorney, Agent, or Firm—Charles W. Chandler

[57] ABSTRACT

A method for encasing a fiberglass mat between a pair of plastic sheets. The fiberglass mat is disposed in a vacuum chamber in which a first sheet is mounted above the mat to form one wall of the chamber. The sheet is heated until it becomes adhesive. A vacuum is applied beneath the sheet to draw it into intimate contact with the mat. The sheet is cooled and trimmed and the mat turned upside down. A second plastic sheet is suspended adjacent the mat and heated until it becomes adhesive. A vacuum is applied beneath the second sheet so that it is drawn toward the first sheet, compressing the fiberglass mat to reduce its thickness. The two sheets are heat sealed around the mat so that it is encased in a compressed condition between the two sheets.

2 Claims, 3 Drawing Sheets

ARTICLE OF MANUFACTURE AND METHOD FOR ENCASING SAME

This invention is related to a method for encasing an article, such as a fiberglass mat, between a pair of plastic sheets.

Fiberglass mats are used as a deadening material in automobiles, and as insulation in a variety of products. This material has a tendency to break down when being handled, causing the skin of the user to itch.

Efforts have been directed toward developing a process for encasing fiberglass mats in various materials. As far as I am aware, such processes have not been widely used in industrial applications without a considerable expense.

Vacuum-forming techniques have been disclosed for upholstering a product by placing an expandible plastic film over one side of a cushioning material mounted on a frame, and then applying a controlled vacuum to tightly draw the film against the frame. One such process has been disclosed in U.S. Pat. No. 3,589,967 which issued June 29, 1971 to Katsuya Shirakawa. In this process, the film is heated as it is being drawn by the vacuum to make the film pliable so that it conforms to the contour of the cushioning material. It is believed that this process is unsuitable for encasing a compressible material, such as fiberglass, in a thin plastic sheet because of the tendency of the sheet to tear when not properly processed.

SUMMARY OF THE INVENTION

The broad purpose of the present invention is to provide an improved method for encasing a fiberglass mat in a plastic film or sheet.

Another object of the invention is to provide an article of manufacture in which a fiberglass mat is compressed and enclosed between a pair of plastic sheets. The two sheets have their edges heat-sealed around the periphery of the mat. Each sheet is adhesively attached to the surface of the fiberglass mat.

The preferred method, which will be described in greater detail, comprises placing a fiberglass mat on a preheated, perforated, metal base. The base forms the top wall of a lower vacuum chamber connected to a vacuum pump. The mat can take any of a variety of configurations.

The base has vertical sidewalls that extend around the mat. A sheet of air-impervious, polyethylene plastic material is mounted on the sidewalls above the mat. The plastic sheet forms the top wall of an air-tight chamber for the mat. The sheet is heated by the preheated base. The sheet, base and mat are then placed beneath a radiant heater which further heats the sheet until it becomes adhesive. The vacuum pump then lowers the pressure beneath the sheet, drawing it toward the base to intimately engage the mat. The heated sheet adheres to the surface of the fiberglass mat, and compresses it to a desired thickness. The sheet is then cooled to take a set conforming to the configuration of one side of the mat.

The sheet is trimmed to form a continuous lip around the mat and perforated with a pattern of small openings. The sheet and the mat are then turned upside-down. A second plastic sheet is suspended above the mat and heated. A vacuum is applied beneath the second sheet which adheres to the opposite side of the mat and the trimmed edge of the first sheet. The second sheet is also cooled and trimmed to form a finished article in which the compressed mat is encased between the two sheets.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
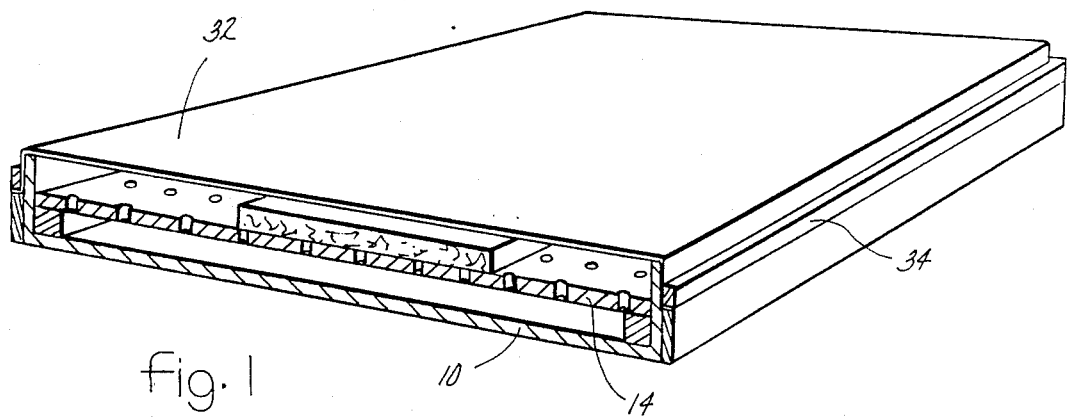
FIG. 1 illustrates the initial step for encasing a fiberglass mat in accordance with the preferred embodiment of the invention.
Figure 2:
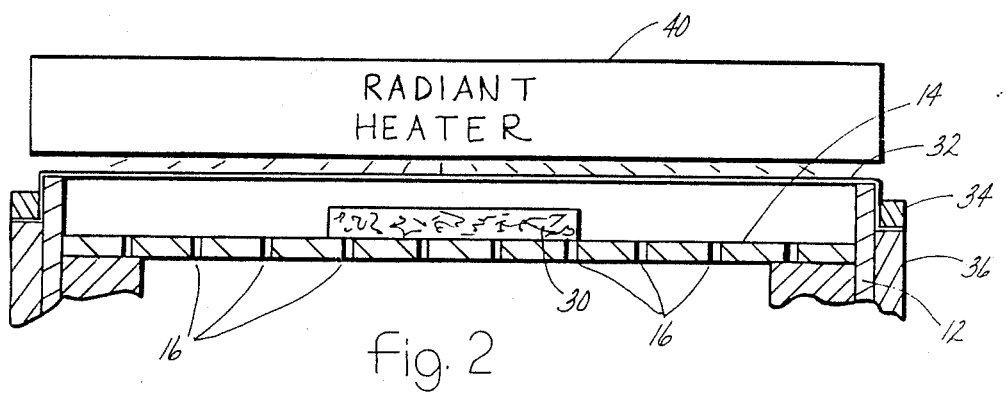
FIG. 2 illustrates the heating step.

Referring to the drawings, FIG. 1 illustrates a tool formed of an aluminum base 10 having an upstanding sidewall 12. The base preferably has a rectangular configuration. Sidewall 12 extends around the four sides of the base.

The base has a horizontal, planar support 14. Support 14 has a pattern of passages or openings 16. Support 14 is mounted above bottom wall 18 of the base to form vacuum chamber 20. The bottom wall has an opening 22 connected by a conduit 24 to a source of vacuum 26, such as a vacuum pump, which is operable to form a low-pressure zone in vacuum chamber 20.

Preferably, base 10 is preheated by any suitable means, not shown. The article that is to be encased, such as a porous, fibrous, compressible, fiberglass mat 30, is placed on support 14 over openings 16. The pattern of openings extends beyond the border of the mat.

The fiberglass mat may have any suitable thickness and configuration. For example, the mat may have a configuration accommodating a motor vehicle part on which it is to be mounted. Further, several mats can be mounted on the base and simultaneously encased. The mat may have an irregular contour, and may be seated in a cavity, not shown, having a matching contour.

A flexible, air impervious, polyethylene sheet 32, about 3 mm. thick, is then mounted on the sidewalls above the top surface of the mat. The sheet is mounted over the entire base. A four-sided frame 34 is lowered on the edges of the sheet onto shoulder 36 to form an air-tight seal around the top of the base. Thus, the mat is disposed in a vacuum chamber defined by support 14, sidewall 12 and sheet 32. The sheet is preferably of the type known as an anti-static material, available from Carroll Products, Inc. of Sterling Heights, Mich.

The base, mat and sheet 32 are then placed beneath a radiant heater 40. Heater 40 is energized for about a second. The heat from both the base and the radiant heater heats sheet 32 such that it tends to lose any wrinkles and becomes somewhat rounded between opposite sides of the sidewall. At this stage, the sheet usually is suspended above the article, and becomes adhesive.

Figure 3:
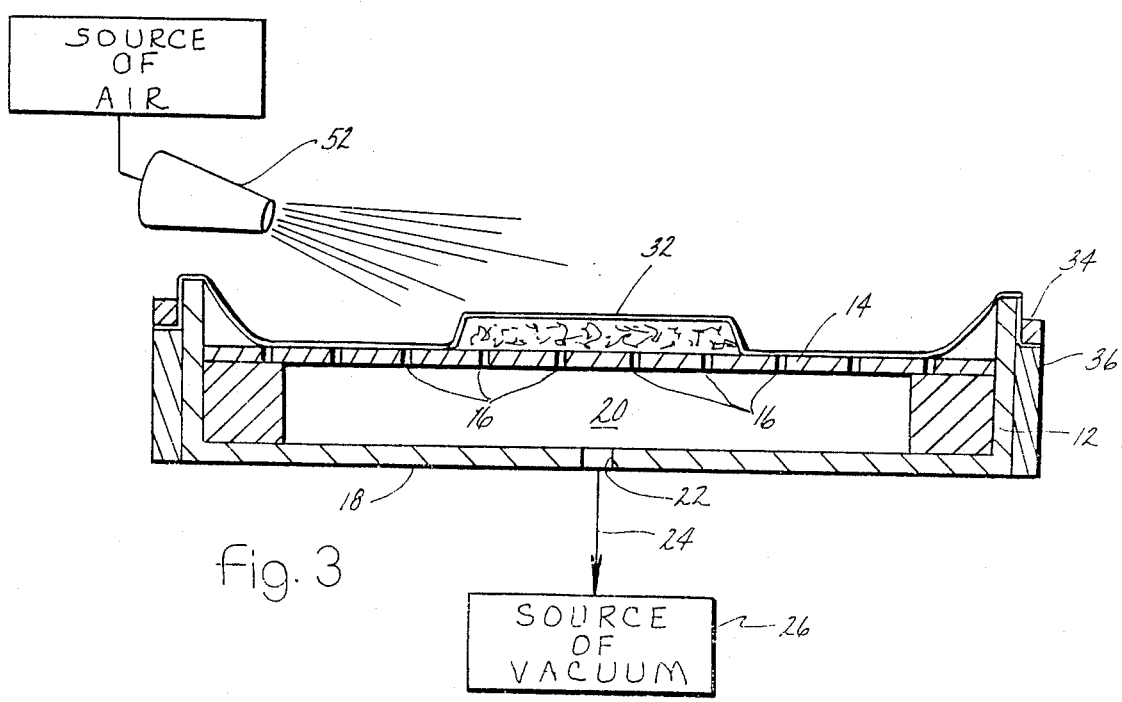
FIG. 3 illustrates the vacuum forming and cooling steps.

Referring to FIG. 3, the vacuum pump then withdraws the air from chamber 20, and through openings 16 creates a low pressure area beneath sheet 32 drawing it into intimate contact with the mat. The vacuum is applied beneath the sheet for about five seconds, until the sheet adheres to the mat and slightly penetrates the fiberglass material. The sheet also compresses the mat.

Blower means 52 then blows cool air on the sheet so that it freezes or takes a set, conforming to the configuration of the mat.

Figure 4:
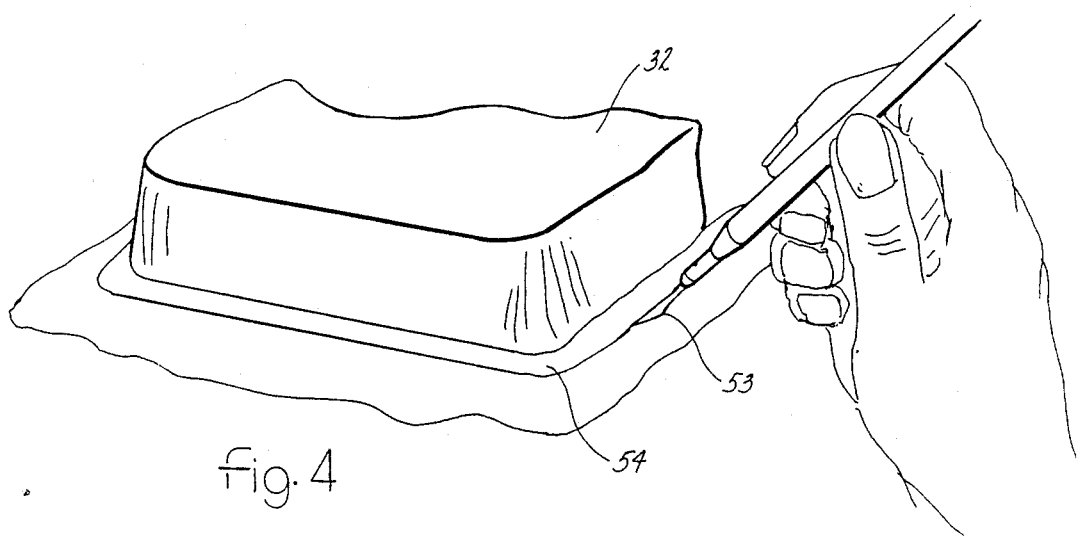
FIG. 4 illustrates the trimming step for the first plastic sheet.

Referring to FIG. 4, cutting means 53 is employed to trim the sheet around the mat to form a lip 54, about ½ inch wide, completely around the mat.

Figure 5:
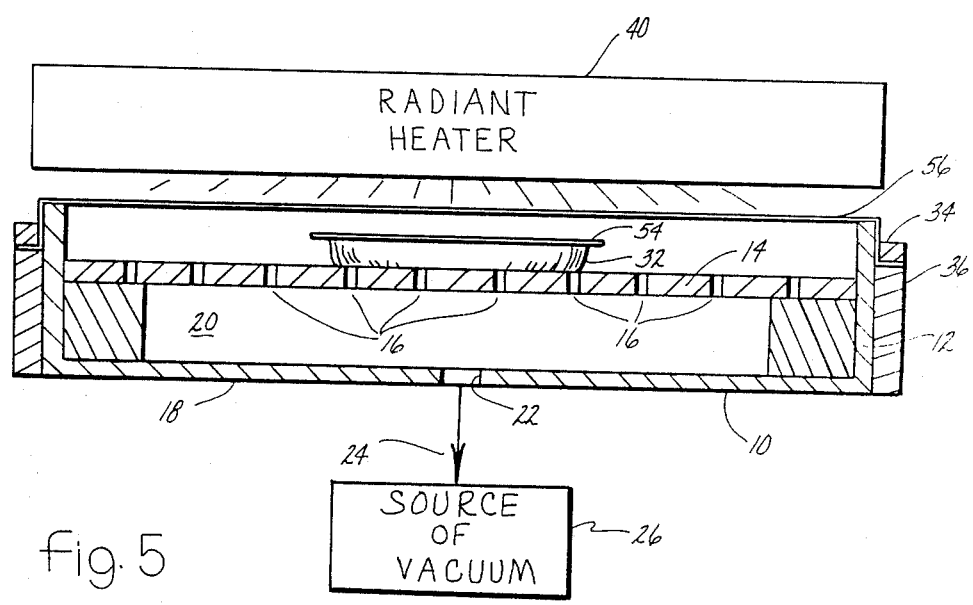
FIG. 5 illustrates the step for attaching the second sheet to the fiberglass mat.

Referring to FIG. 5, mat 30 and trimmed sheet 32 are then turned upside-down and placed on preheated base 14.

A second sheet 56 of the same flexible plastic film as sheet 32, about 3 mm. thick, is then mounted on sidewall 12 above the mat to form the top wall of a vacuum chamber for the mat.

The mat and the second sheet are then placed beneath the radiant heater.

Sheet 56 is heated until it becomes adhesive. The vacuum pump is energized to create a low pressure zone beneath sheet 56 drawing it toward both the upper, exposed surface of the mat and lip 54.

Figure 6:
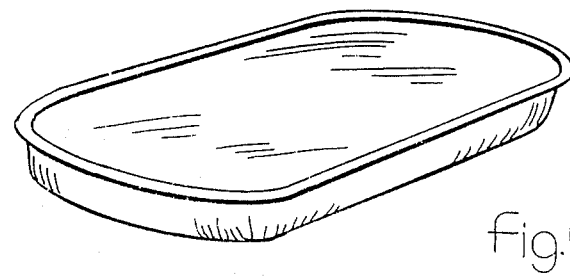
FIG. 6 is a view of a finished product.
Figure 7:
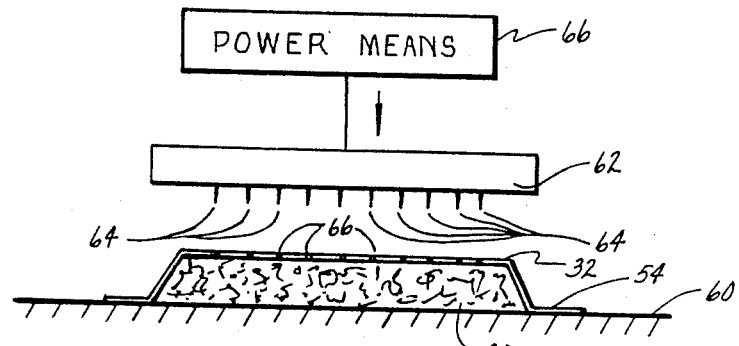
FIG. 7 illustrates the step for perforating the first plastic sheet.
Figure 8:
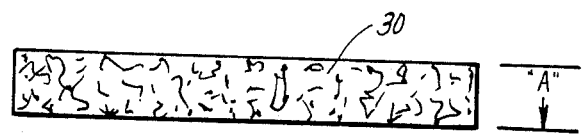
FIGS. 8-9 illustrate the compression of the fiberglass mat.
Figure 9:
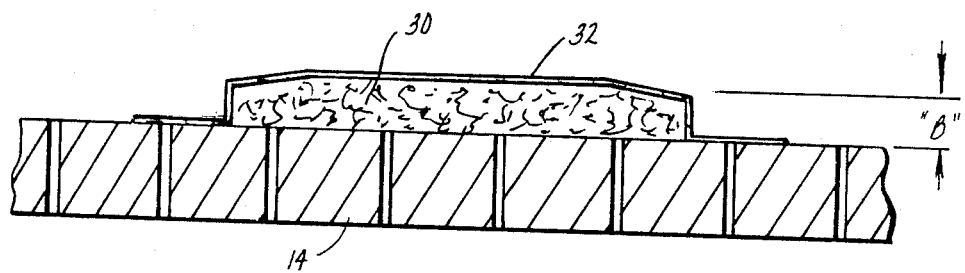
Figure 10:
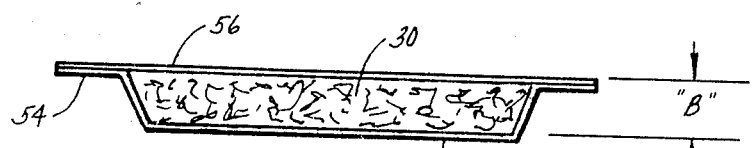
FIG. 10 is a sectional view through the finished product.

Sheet 56 then intimately contacts the mat and slightly penetrates it as the sheet adheres to the fiberglass material. Sheet 56 contacts lip 54 to form a heat-sealed seam completely around the mat. Sheet 56 also compresses the mat to, for example, from thickness "A", as shown in FIG. 8 to about 50 percent of its original thickness "B" as shown in FIGS. 9 and 10. Blower means 52 blows cooling air on sheet 56 to cool and freeze it. Sheet 56 is then trimmed to form a finished product, as illustrated in FIGS. 6 and 10, in which the compressed mat is enclosed in an envelope formed by the two plastic sheets.

The finished product retains the principal insulation characteristics of the fiberglass insulation which no longer has the itchy properties of the encased material.

Mat 30 is compressed to a degree that depends upon the desired thickness of the finished product, the initial thickness of the mat, and other considerations.

Upon some circumstances, the first sheet applied to the mat is perforated in order to increase the amount of compression of the mat. In such a situation, mat 30 and trimmed sheet 32 are placed on a support 60 beneath a board 62 having a plurality of piercing elements 64 arranged in a suitable pattern. Power means 66 then lowers board 62 so that piercing elements 64 perforate sheet 32, forming small pin holes 66 through the sheet.

When the mat is then placed on support 14 in the step described with reference to FIG. 5, the perforated sheet 32 permits the low pressure area to be applied through the porous mat to draw sheet 56 down onto the mat so that it more readily is able to compress the mat.

The process is relatively inexpensive and provides an article that can be encased in a short period of time. The process further provides means for forming a compressed product of a material such as a fibrous fiberglass mat because the polyethylene sheets retain the mat in its compressed condition when the sheets have been cooled.

Having described my invention, I claim:

1. An article of manufacture comprising:
   a first sheet of flexible plastic material, and a second sheet of flexible plastic material;
   a porous body comprising a fiberglass mat having good sound deadening and insulation properties, and a first side, and a second side, spaced from the first side, and a continuous side edge between and bordering said first and second sides;
   the porous body being encapsulated between the first sheet of flexible plastic material and the second sheet of flexible plastic material; being at least partially embedded across the entire surface of both of said
   said sheets of plastic material being at least sides of the porous body; and
   the first sheet of plastic material being heat-sealed to the second sheet of plastic material adjacent the side edge of the porous body to form a continuous heat-sealed seam around the body;
   whereby the article retains at least a portion of the sound-deadening and insulation properties of the porous body.

2. An article of manufacture as defined in claim 1, and in which at least one of said sheets of plastic material has opening means for passing air but not portions of the porous body.

* * * * *

UNITED STATES PATENT OFFICE
CERTIFICATE OF CORRECTION

Patent No. 4,880,680                    Dated November 14, 1989

Inventor(s) David R. Kistner

It is certified that error appears in the above-identified patent and that said Letters Patent is hereby corrected as shown below:

In Claim 1, column 4, line 33 of the Patent, delete the phrase:

"being at least partially embedded across the entire surface of both of said said sheets of plastic material being at least sides of the porous body; and"

and insert thereinstead:

---said sheets of plastic material being at least partially embedded across the entire surface of both of said sides of the porous body; and---

Signed and Sealed this

Seventh Day of April, 1992

*Attest:*

HARRY F. MANBECK, JR.

*Attesting Officer*  *Commissioner of Patents and Trademarks*